US012750597B2

(12) United States Patent
Weisfield et al.

(10) Patent No.: US 12,750,597 B2
(45) Date of Patent: Sep. 29, 2026

(54) IMAGING SYSTEM WITH NOISE REDUCTION

(71) Applicant: Varex Imaging Corporation, Salt Lake City, UT (US)

(72) Inventors: Richard Weisfield, Los Gatos, CA (US); Steven Freestone, Sandy, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 222 days.

(21) Appl. No.: 17/919,518

(22) PCT Filed: Sep. 17, 2022

(86) PCT No.: PCT/US2022/043910

§ 371 (c)(1),
(2) Date: May 31, 2024

(87) PCT Pub. No.: WO2023/044081

PCT Pub. Date: Mar. 23, 2023

(65) Prior Publication Data

US 2024/0298095 A1 Sep. 5, 2024

Related U.S. Application Data

(60) Provisional application No. 63/245,459, filed on Sep. 17, 2021.

(51) Int. Cl.
*H04N 5/357* (2011.01)
*H04N 25/30* (2023.01)
(Continued)

(52) U.S. Cl.
CPC ............ *H04N 25/30* (2023.01); *H04N 25/40* (2023.01); *H04N 25/65* (2023.01)

(58) Field of Classification Search
CPC ........ H04N 25/30; H04N 25/40; H04N 25/65; H04N 25/617; H04N 25/709; H04N 25/77;
(Continued)

(56) References Cited

U.S. PATENT DOCUMENTS 6,538,591 B2 3/2003 Sato et al.
7,133,074 B1 11/2006 Brehmer et al.
(Continued)

FOREIGN PATENT DOCUMENTS

EP 2806628 A1 11/2014
JP 2001056382 A 2/2001
(Continued)

OTHER PUBLICATIONS

U.S. Appl. No. 17/334,681, Response to Office Action dated Apr. 28, 2023.
(Continued)

*Primary Examiner* — Courtney D Thomas
(74) *Attorney, Agent, or Firm* — Dorsey & Whitney LLP

(57) ABSTRACT

Embodiments include applying a first pulse to a first gate line of a plurality of gate lines of an imaging array; applying a second pulse to other gate lines of the plurality of gate lines while applying the first pulse, the second pulse having a polarity opposite to the first pulse; and sampling pixels coupled to the first gate line while applying the first pulse using sampling circuits.

20 Claims, 13 Drawing Sheets

(51) Int. Cl.
*H04N 25/40* (2023.01)
*H04N 25/65* (2023.01)

(58) Field of Classification Search
CPC ........ H04N 25/779; H04N 5/357; G01T 1/17; G01T 1/247
See application file for complete search history.

(56) References Cited

U.S. PATENT DOCUMENTS

| | | | | |
|---|---|---|---|---|
| 7,796,174 | B1 | 9/2010 | Harwit et al. | |
| RE41,865 | E | 10/2010 | Choi | |
| 8,558,929 | B2 | 10/2013 | Tredwell | |
| 9,332,950 | B2 | 5/2016 | Spartiotis et al. | |
| 9,478,692 | B1 | 10/2016 | Twede et al. | |
| 10,498,989 | B1 | 12/2019 | Oh et al. | |
| 2001/0012070 | A1 | 8/2001 | Enod et al. | |
| 2003/0169847 | A1 | 9/2003 | Karellas et al. | |
| 2004/0178349 | A1 | 9/2004 | Kameshima | |
| 2008/0149843 | A1 | 6/2008 | Tredwell | |
| 2010/0141804 | A1 | 6/2010 | Morel et al. | |
| 2012/0138808 | A1 | 6/2012 | Jung | |
| 2014/0016879 | A1 | 1/2014 | Högasten et al. | |
| 2014/0340552 | A1 | 11/2014 | Wuen et al. | |
| 2015/0049230 | A1 | 2/2015 | Lee et al. | |
| 2015/0229859 | A1* | 8/2015 | Guidash ............... | H04N 25/583 348/308 |
| 2015/0303232 | A1 | 10/2015 | Yamazaki | |
| 2015/0319382 | A1 | 11/2015 | Kawanabe et al. | |
| 2016/0273961 | A1 | 9/2016 | Kim | |
| 2016/0316161 | A1 | 10/2016 | Sekine | |
| 2017/0188987 | A1 | 7/2017 | Liu et al. | |
| 2017/0208272 | A1 | 7/2017 | Guidash et al. | |
| 2021/0126025 | A1 | 4/2021 | Kennedy et al. | |
| 2021/0327946 | A1 | 10/2021 | Guo et al. | |

FOREIGN PATENT DOCUMENTS

| | | | |
|---|---|---|---|
| JP | 2002330348 | A | 11/2002 |
| JP | 2003265453 | A | 9/2003 |
| JP | 2005318242 | A | 11/2005 |
| WO | 99/07138 | | 2/1999 |

OTHER PUBLICATIONS

U.S. Appl. No. 17/334,681, Office Action dated Nov. 28, 2022.

EP22870799.8 Extended European Search Report dated Jun. 3, 2025.

U.S. Appl. No. 17/334,353, Response dated Jun. 7, 2023.

U.S. Appl. No. 17/334,353, Examiner Interview Summary dated Jul. 3, 2023.

U.S. Appl. No. 17/334,353, Notice of Allowance dated Oct. 3, 2023.

U.S. Appl. No. 17/334,681, Notice of Allowance dated Aug. 9, 2023.

U.S. Appl. No. 17/334,681, Examiner Interview Summary dated Aug. 24, 2023.

U.S. Appl. No. 17/334,681, Corrected Notice of Allowability dated Aug. 24, 2023.

Fowler et al., Reset Noise Reduction in Capacitive Sensors, IEEE Transactions on Circuits and Systems, vol. 53, No. 3, Aug. 2006.

Steven Freestone, Richard Weisfield, Carlo Tognina, Isaias Job, and Richard E. Colbeth, Analysis of a New Indium Gallium Zinc Oxide (IGZO) Detector, Proc. SPIE 11312, Medical Imaging 2020: Physics of Medical Imaging, 113123W (Mar. 16, 2020).

Int'l Appl. No. PCT/US2022/031465, International Search Report dated Sep. 14, 2022.

Int'l Appl. No. PCT/US2022/031465, Written Opinion dated Sep. 14, 2022.

U.S. Appl. No. 17/334,353, Office Action dated Feb. 7, 2023.

Int'l Appl. No. PCT/US2022/043910, International Search Report dated Jan. 3, 2023.

Int'l Appl. No. PCT/US2022/043910, Written Opinion dated Jan. 3, 2023.

* cited by examiner

IMAGING SYSTEM WITH NOISE REDUCTION

X-ray imaging systems may be used to generate two-dimensional images or video in response to incident x-rays. Noise may accumulate in a pixel of an imaging array. While various techniques such as correlated double sampling may reduce or eliminate noise, the noise in the pixel itself may remain.

DETAILED DESCRIPTION

Some embodiments relate to imaging systems with noise reduction. Electronic noise in x-ray detectors, such as thin film transistor (TFT) x-ray detectors, is one of the major factors in determining the minimum useable x-ray dose. Previous solutions to minimize electronic noise have focused on charge amplifier and analog-to-digital converter (ADC) improvements, bias and gate voltage regulation, and minimizing pixel and dataline capacitances in the sensor array of an imaging system. Pixel capacitance has been reduced by thickening the photodiode layer to greater than 1 micrometer (μm); dataline capacitance has been reduced by minimizing line widths, using lower permittivity interlayer dielectrics, and using high mobility self-aligned TFTs like indium gallium zinc oxide (IGZO), that can be fabricated with minimum design rules to minimize TFT capacitance. All these factors have contributed to reducing overall electronic noise.

With the development of high-mobility, minimum-size self-aligned TFTs and low noise charge amplifiers, the contribution to overall electronic noise has been reduced to approximately 400 to 500 electrons (e) in some IGZO panels. With this level of electrical noise, additive pixel noise is at about the same level as dataline readout noise.

Minimizing pixel noise may be significant in reducing overall electronic noise. Pixel noise is noise generated primarily from pixel components, such as the pixel capacitor or pixel capacitance.

Conventional readout schemes provide gate compensation from the prior row of readout or from turning off the TFTs in the current row of readout. This method of readout compensates for the Gate-ON charge produced when turning on each TFT. The result is a fairly flat well-compensated dark image. A dark image is an image generated by the pixels when no x-rays are incident on the pixels. The downside is that the operation integrates two sources of kTC noise, one kTC from charge left in the pixel from the prior frame of readout and a second kTC from the compensating TFT-off pulse, either from the prior row in the image or from reading out after turning off the TFT of the current pixel. The pixel noise in such a readout operation is about the square root of 2kTC ($\sqrt{2kTC}$). For a 100 μm pixel, the pixel noise may be about 450e, which may be about equivalent to the column noise generated by charge amplifier and dataline capacitance. Operations described herein may reduce the contribution of pixel noise, reducing the overall electronic noise. kTC noise, also referred to as Johnson-Nyquist noise, thermal noise, Johnson noise, or Nyquist noise, is the electronic noise generated by the thermal agitation of the charge carriers (usually the electrons) inside an electrical conductor at equilibrium, which happens regardless of any applied voltage. kTC is acronym referring to Boltzmann constant (k), temperature (T), and capacitance (C) that contributes to the thermal noise.

Figure 1A:
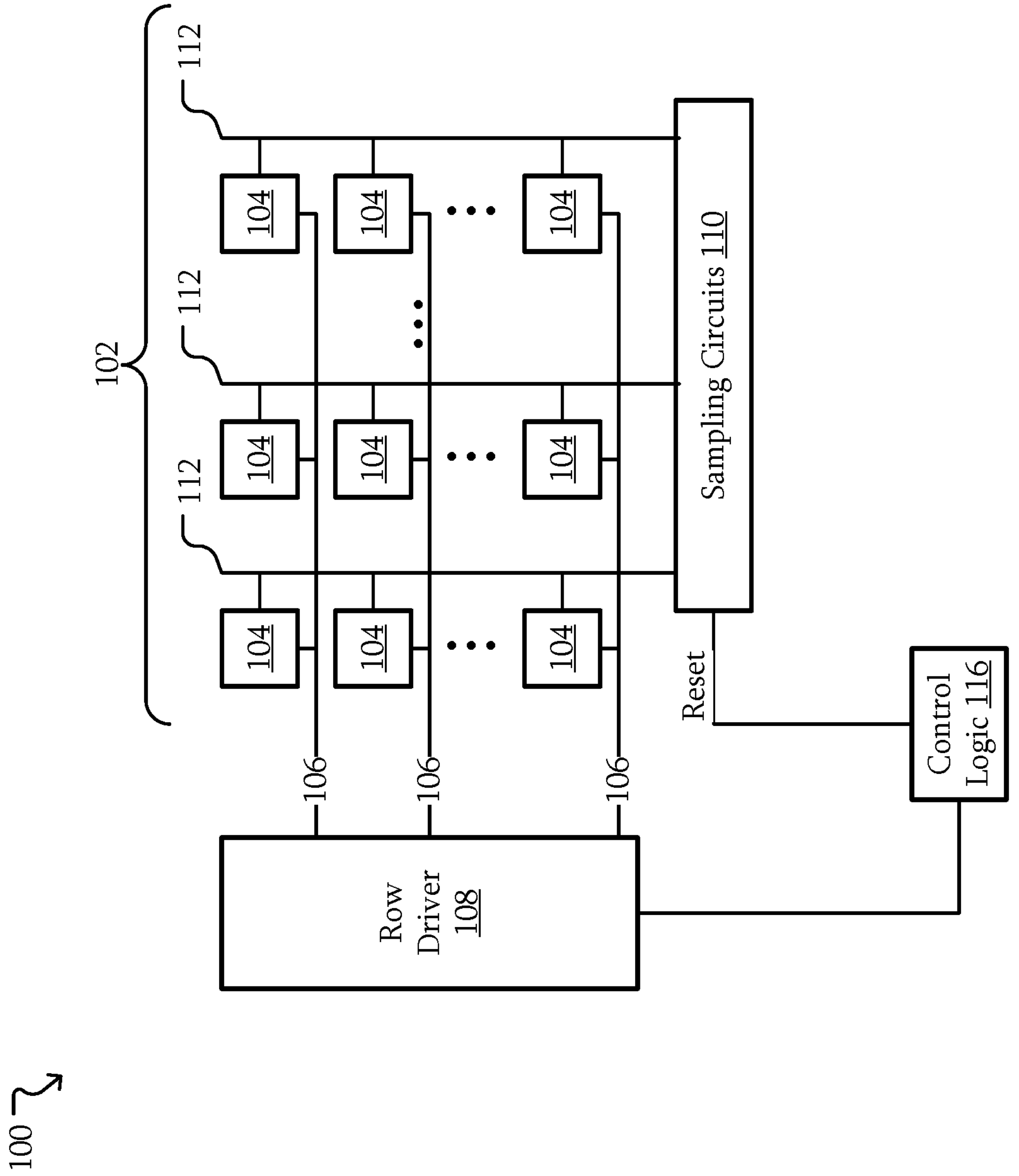
FIG. 1A is a block diagram of an imaging system according to some embodiments.
Figure 1B:
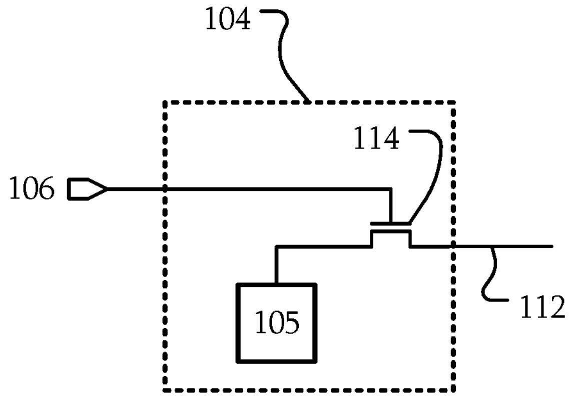
FIG. 1B is a block diagram of a pixel of the imaging system of FIG. 1A.

FIG. 1A is a block diagram of an imaging system according to some embodiments. FIG. 1B is a block diagram of a pixel of the imaging system of FIG. 1A. Referring to FIGS. 1A and 1B, in some embodiments the imaging system 100 includes an imaging array 102 including multiple pixels 104. Each pixel includes a sensor 105 such as a photodiode, photodetector, a circuit including such devices, or the like. The sensor 105 is configured to convert x-rays, light, or other photons into an electrical charge or voltage. A scintillator, direct conversion material, or other x-ray conversion material may be part of the imaging array 102 and configured to convert incident x-rays into photons that the sensor 105 may convert into an electrical signal. For example, a scintillator may include a variety of materials configured to convert x-ray photons into photons detectable by the sensors 105 such as cesium iodide (CsI), cadmium tungstate ($CdWO_4$), polyvinyl toluene (PVT), gadolinium oxysulfide ($Gd_2O_2S$; GOS; Gadox), gadolinium oxysulfide doped with terbium ($Gd_2O_2S$:Tb), or the like. Examples of direct conversion materials include cadmium telluride (CdTe), cadmium zinc telluride (CdZnTe or CZT), selenium, or the like.

Each pixel 104 is coupled to a corresponding gate line 106. The pixels 104 of a row may be coupled to the same gate line 106; however, in other embodiments, pixels 104 of a row may be coupled to multiple gate lines 106, subsets of the pixels 104 of a row may be coupled to the same gate line 106, or the like. The gate lines 106 are coupled to a row driver 108. The row driver 108 is configured to apply voltages to the gate lines 106. Various embodiments will be described below where the timing, voltages, pulses, or the like of the signals applied to the gate lines 106 may reduce pixel noise. Each pixel 104 is selectively couplable to the corresponding data line 112 through a switch 114, such as a TFT. The switch 114 may be responsive to a signal on the corresponding gate line 106.

The imaging system 100 includes sampling circuits 110 configured to sample signals from the pixels 104. The sampling circuits 110 include circuits such as charge amplifiers, ADCs, sample-and-hold circuits, or the like configured to perform the sampling. The sampling circuits 110 are coupled to the pixels 104 through data lines 112.

The imaging system 100 includes control logic 116. The control logic 116 may be configured to control various operations described herein. The control logic 116 may include a general purpose processor, a digital signal processor (DSP), an application specific integrated circuit, a microcontroller, a programmable logic device, discrete circuits, a combination of such devices, or the like. The control logic 116 may include other circuits to couple the control logic 116 to the row driver 108, the sampling circuits 110, or the like to enable the control logic 116 to control the operation of such circuits.

Figure 2:
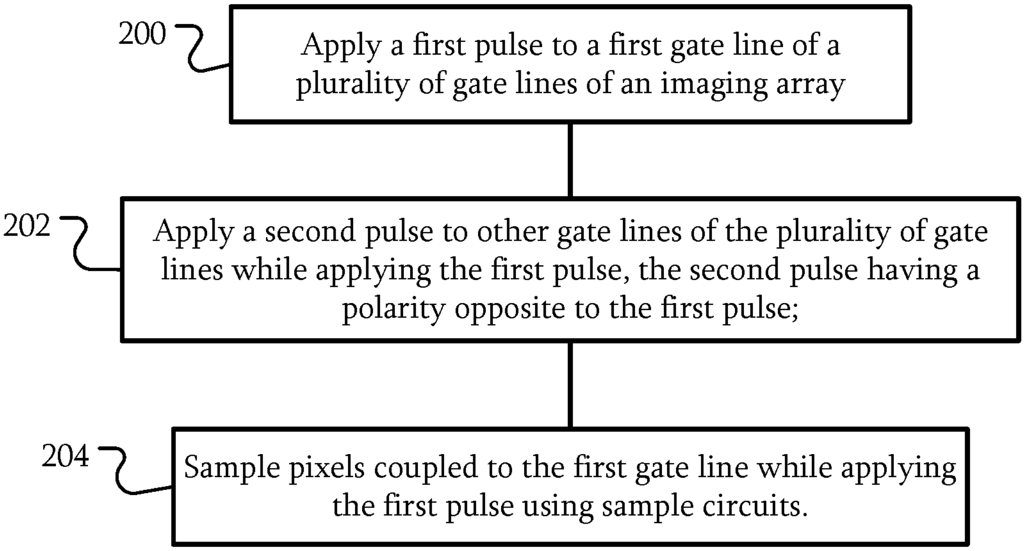
FIG. 2 is a flowchart of an operation of an imaging system according to some embodiments.
Figure 3:
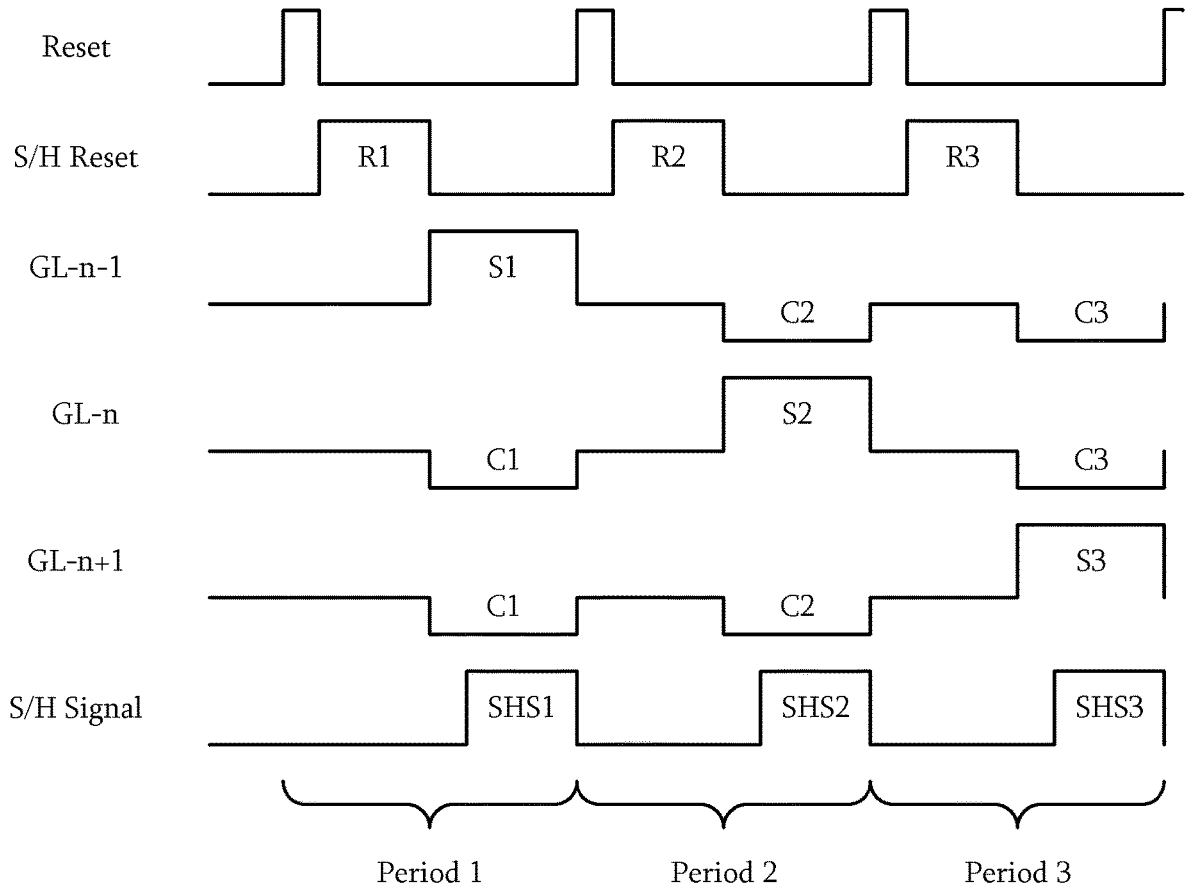
FIG. 3 is a timing diagram of an imaging system according to some embodiments.

FIG. 2 is a flowchart of an operation of an imaging system according to some embodiments. FIG. 3 is a timing diagram of an imaging system according to some embodiments. Referring to FIGS. 1A-3, the imaging system 100 will be used as an example. In FIG. 3, Reset is the reset signal applied to the sampling circuits 110. Sample/hold (S/H) Reset is the sampled reset signal sampled by the sampling circuits 110 after a reset but before a pixel 106 is coupled to a data line 112. R1-R3 represent the sampled reset (R) signal acquired during periods 1-3, respectively. GL-n−1, GL-n, and GL-n+1 represent the signals applied to adjacent gate lines (GL) 106 where S1-S3 (S for signal/pulse) represent an on-voltage pulse that couples the pixels 104 associated with the gate line 106 to the respective data lines 112. C1-C3 represent a compensation (C) voltage pulse applied to gate lines 106 of rows that are not being sampled in the particular period 1-3. S/H Signal represents the signal sampled while the pixels 106 are coupled to the respective data lines 112. SHS1-SHS3 represent the sampled signals from periods 1-3, respectively.

During period 1, in 200, a first pulse S1 is applied to a first gate line GLn−1 of the gate lines 106 of an imaging array 102. In 202, a second pulse C1 is applied to other gate lines GLn and GLn+1 while applying the first pulse S1. The second pulse C1 has a polarity opposite to the first pulse S1 relative to a nominal level such as ground. The second pulse C1 may also be opposite in magnitude to the first pulse S1 relative to a nominal level. For example, the first pulse S1 may be about −10 to 10 volts (V) while the second pulse C1 may be about −10 to about 10.1 V. In 204, pixels 104 coupled to the first gate line GLn−1 are sampled while applying the first pulse S1 using sampling circuits 110. The sampled signal is represented by the sampled signal SHS1.

In some embodiments, the pulses S1 and C1 have the same period and timing. The pulse S1 is compensated by the pulse C1 on the other gate lines GL-n and GL-n+1. This operation compensates the TFT on-charge on other gate lines 106 that the gate line GLn−1 of the row that is currently being read. The pixel 104 is sampled before turning off pulse S1 on gate line GLn−1. This operation eliminates one source of kTC noise, namely, the kTC noise when the TFT is turned off by the end of the pulse S1.

In some embodiments, the pixels 104 are serially coupled in a row to the gate lines 106. The gate lines 106 may be driven from the side of the imaging array 102 with the row driver 108. As a result, the pulses S1 and C1 propagate along the gate lines together. The propagation may minimize or eliminate an image gradient from the driven side to the undriven side of the imaging array 102

In some embodiments, a reduction in noise-equivalent dose (NED) may be about 20% or more. For example, in a conventional gate compensation operation, an amount of noise may be about 800e. However, using a technique as described herein may reduce the electronic noise to about 700e. This lower noise translates into a 20% reduction in NED.

In some embodiments, a threshold voltage of the switch 114 may affect the dark level. The dark level is an output of the pixel 104 when no x-rays are incident on the pixel 104. A different threshold voltage may affect the charge transferred through the switch 114. For example, amorphous silicon (a-Si) transistors may have a threshold voltage that shifts over time. This threshold voltage shift may result in a dark level that moves up and down. IGZO transistors may be more stable. Other conditions such as radiation stability may also cause the threshold voltage to move, affecting the dark level.

In some embodiments, the gain of the sampling circuits 110 may be relatively high. The gain may be higher because of a lower signal during a particular operation. For example, during a video acquisition, a lower dose x-ray beam may be used to limit the dose received by a patient. Although video has been used as an example, the gain may be higher and/or the signal may be lower in other operations, including static image operations. For example, high gain may be used when imaging through a block of steel or pipe.

Because of the high gain in some operations, a wider range of the entire dynamic range of an amplifier of the sampling circuits 110 may be taken by the variability in dark level. A drift of the compensation voltage may increase the range of the dark level. As will be described in further detail below, the compensation voltage may be stabilized and, as a result, an amount of drift in the dark level may be reduced.

Figure 4:
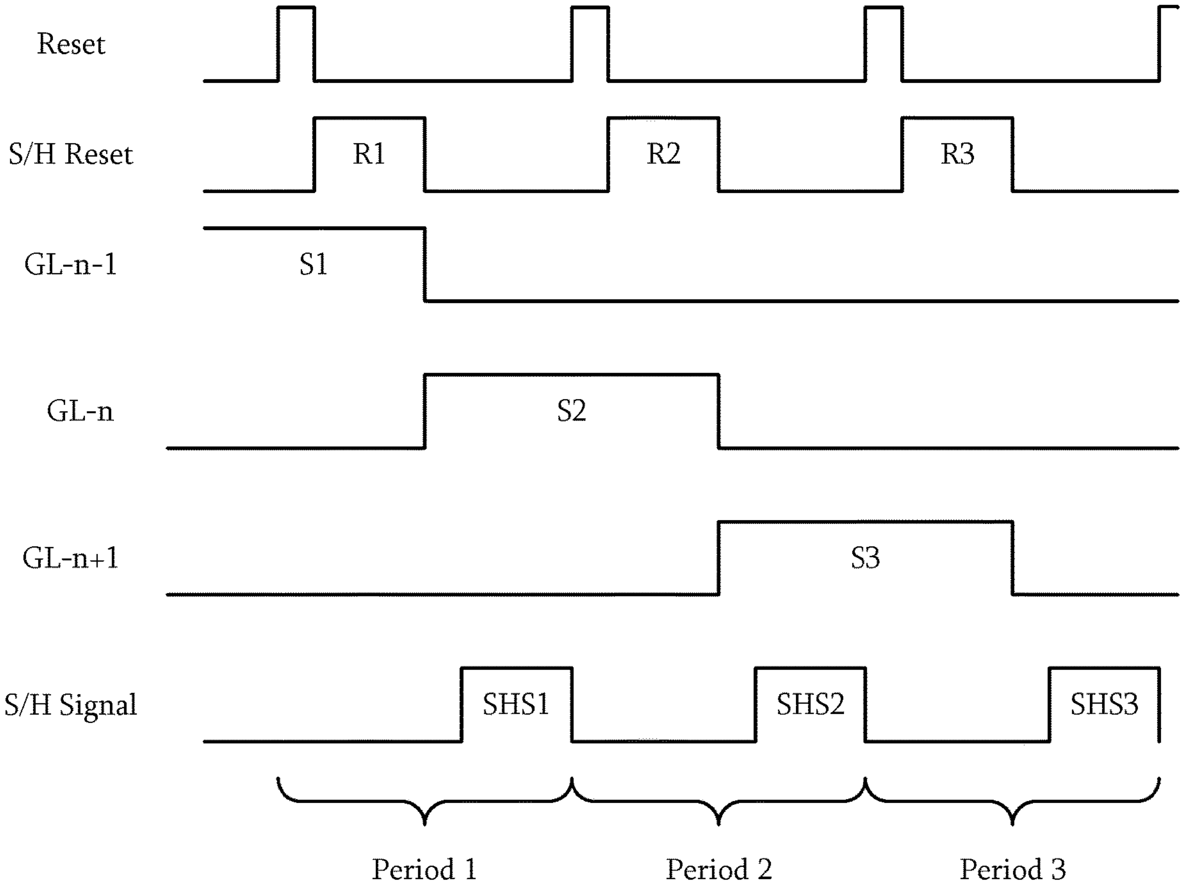
FIG. 4 is a timing diagram of a two-rail readout technique.

FIG. 4 is a timing diagram of a two-rail readout technique. The signals may be similar to that of FIG. 3; however, the timing, pulses, levels, or the like may be different. The sampling circuits 110 are reset in response to the reset pulse and the reset signal is sampled during the S/H reset period. For pixels 104 coupled to a gate line 106 that will be read, the gate line 106 is activated during the prior period while the other gate lines 106 are held at a nominal voltage. For example, when reading pixels 106 coupled to gate line GL-n, the pulse S2 is applied in period 1. The other row's switches 114 are turned off simultaneously. That is, the pulse S1 on gate line GL-n−1 is deactivated and gate line GL-n+1 remains in a deactivated state. The pixel noise includes the square root of kTC stored in the pixel when the TFT is turned off from the previous frame, plus a second square root of kTC noise read out from the previous row in the current frame. The effective noise may be about 2kTC.

Figure 5:
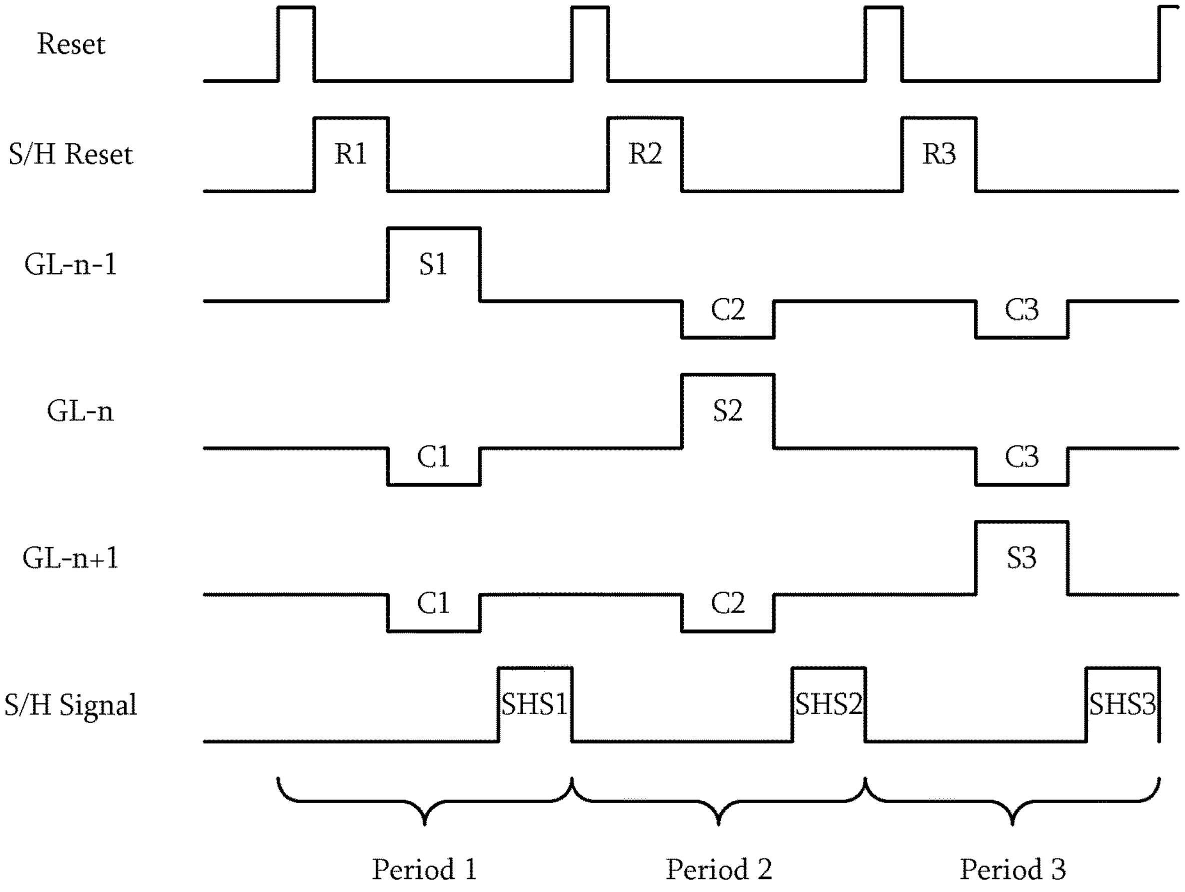
FIG. 5 is a timing diagram of an on-off readout technique.

FIG. 5 is a timing diagram of an on-off readout technique. The signals may be similar to that of FIG. 3; however, the timing, pulses, levels, or the like may be different. The sampling circuits 110 may be reset and the reset signal sampled similar to that of FIGS. 3 and 4. For pixels 104 coupled to a gate line 106 that will be read, the gate line 106 is activated during a period with a pulse while the other gate lines 106 are activated with a compensation pulse. Using period 1 as an example, a gate line GL-n−1 is activated with pulse S1. The other gate lines GL-n and GL-n+1 are pulsed at substantially the same time with an opposite compensation pulse C1. The signal may be sampled as signal SHS1. In particular, the signal is sampled after an end of the pulse S1 in period 1. The pixel noise includes the square root of kTC stored in the pixel when the TFT is turned off from the previous frame, plus a second square root of kTC noise read out from the previous row in the current frame. The effective noise may be about 2kTC.

Some embodiments may have improvements in noise performance with different levels of binning. Pixel binning, often called binning, is the process of combining adjacent pixels throughout an image, by summing or averaging their values, during or after readout. In Table 1 below are results from a 2-rail mode of operation (standard) and a 3-rail mode of operation (low noise). The results include the electronic noise, sensitivity, noise equivalent dose (NED), and max linear dose (MLD). The results include pixel binning from 1×1 to 4×4. The gray (Gy) is the unit of ionizing radiation dose in the International System of Units (SI), defined as the absorption of one joule (J) of radiation energy per kilogram (kg) of matter.

To compensate for this gradient, a different technique of global charge compensation is used, namely pulsing all the other gate lines from their normal Gate_Off voltage to a more negative gate compensation voltage, typically −0.1V below Gate_Off. In period 1, pulse C1 represents this compensating pulse. The compensating pulse C1 injects a negative charge along the gate line which follows the same RC delay as the Gate_On pulse, and therefore the dark image gradient is reduced or removed.

Figure 7:
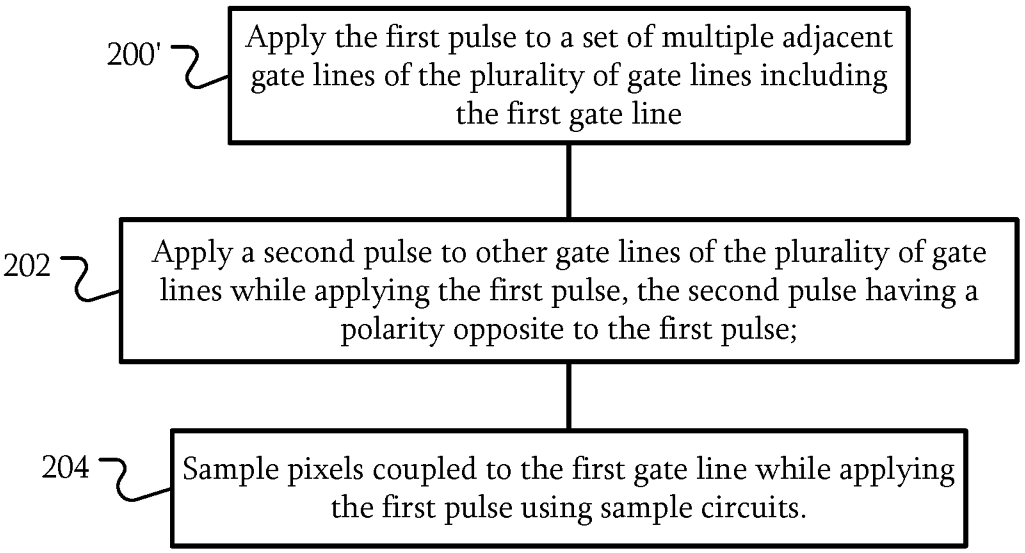
FIG. 7 is a flowchart of an operation of an imaging system according to some embodiments.
Figure 8:
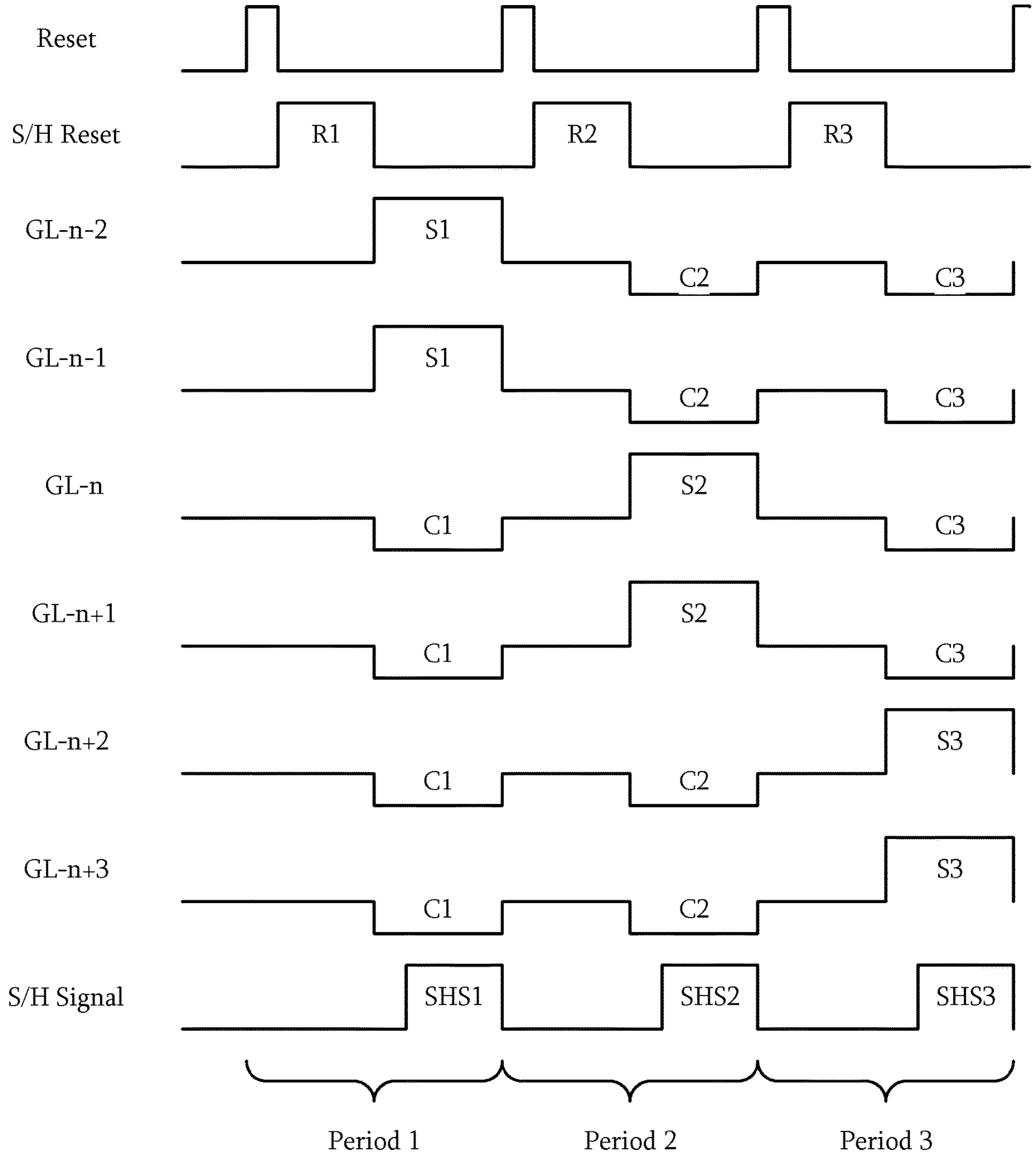
FIG. 8 is a timing diagram of an imaging system according to some embodiments.

FIG. 7 is a flowchart of an operation of an imaging system according to some embodiments. FIG. 8 is a timing diagram of an imaging system according to some embodiments. Referring to FIGS. 1A, 1B, 7, and 8, in some embodiments, the operation may be similar to that described with respect to FIG. 2. However, in 200', the first pulse is applied to a set of multiple adjacent gate lines 106 of the plurality of gate lines 106 including the first gate line 106.

| | Detector Pixel Pitch | | | | | | | |
|---|---|---|---|---|---|---|---|---|
| | 1 × 1 | | 2 × 2 | | 3 × 3 | | 4 × 4 | |
| | Noise Setting | | | | | | | |
| | Standard | Low Noise | Standard | Low Noise | Standard | Low Noise | Standard | Low Noise |
| Electronic Noise ($e^-$) | 767 | 698 | 1290 | 1098 | 1750 | 1460 | 2229 | 1827 |
| Sensitivity ($e^-$/nGy) | 294 | 300 | 1194 | 1182 | 2622 | 2628 | 4720 | 4680 |
| NED (nGy) | 24 | 20 | 6.6 | 4.7 | 3.4 | 2.4 | 2.4 | 1.5 |
| MLD (μGy) | 10.1 | 9.6 | 5.4 | 4.8 | 3.3 | 3.3 | 2.8 | 2.3 |

Figure 6:
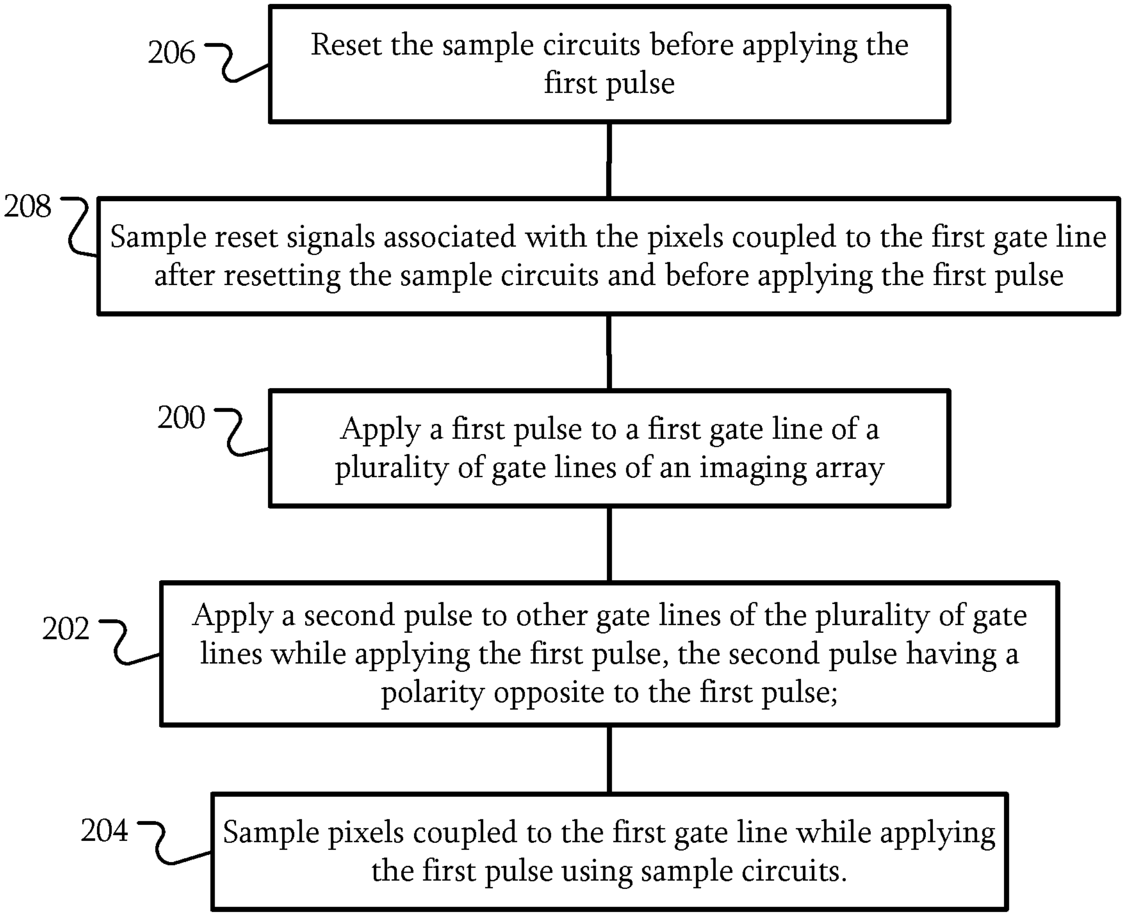
FIG. 6 is a flowchart of an operation of an imaging system with resetting according to some embodiments.

FIG. 6 is a flowchart of an operation of an imaging system with resetting according to some embodiments. Referring to FIGS. 1A, 1B, 3, and 6, in some embodiments the operations may be similar to those described with respect to FIG. 2.

In 206, the sampling circuits 110 are reset before applying the first pulse S1. In 208, reset signals R1 associated with the pixels 104 coupled to the first gate line GLn−1 are sampled after resetting the sampling circuits 110 and before applying the first pulse S1.

In some embodiments, at least a portion of the sampling circuits 110, such as a charge amplifier, may be configured to perform an analog subtraction on the reset signal R1 and the sampled signal SHS1. The result has a substantially reduced or eliminated reset noise. In some embodiments, the subtraction may be performed digitally. That is, both signals R1 and SHS1 may be sampled and digitized. The result may be calculated by subtracting the digitized signals.

The sampled signal SHS1 has four components. The first is the x-ray signal integrated on each pixel 104. The second is a TFT_On charge, which forms a fixed pattern from the array that can be removed through offset correction as described below. The third component is pixel square root of kTC noise that was stored on the pixel from the previous frame when the TFTs for each pixel were turned off. The fourth component is amplifier reset noise, which may be removed through correlated double sampling or other similar operations using the reset signal R1.

The positive TFT_On charge is relatively large and of opposite sign to the negative x-ray signal charge to be measured. To prevent the charge amplifier from going into overload, a negative global charge is applied on each pixel during the period the TFTs are turned On. For small panels, this charge can simply be applied directly to compensation capacitors on each charge amplifier. But for larger arrays, where the gate line RC time constant becomes a significant fraction of the total TFT On-time, such as more than about 10%, a constant gate voltage is not achieved along the length of the gate line. This results in a relatively large gradient in dark value from the driven to undriven ends of the line.

For example, gate lines GL-n−2 to GL-n+3 are six adjacent gate lines. In each period, a set of the gate lines are activated with the on-pulse while the other gate lines are activated with the compensation pulse. In period 1, the gate lines GL-n−2 and GL-n−1 are activated with the pulse S1 while the other gate lines GL-n to GL-n+3 are activated with the compensation pulse C1. In period 2, the gate lines GL-n and GL-n+1 are activated with the pulse S2 while the other gate lines GL-n−2, GLn−1, GL-n+2, and GL-n+3 are activated with the compensation pulse C2. In period 3, the gate lines GL-n+2 and GL-n+3 are activated with the pulse S3 while the other gate lines GL-n−2 to GL-n+1 are activated with the compensation pulse C3.

Using this operation, the gate compensation may be applied when the pixels 104 are operated in an N×N binned mode when N is an integer greater than 1. The contribution from pixel noise increases proportionally with N, while the contribution from dataline noise increases proportionally with the square root of N. The impact of reducing the contribution from pixel noise through operations described herein improves with pixel binning. In 2×2 binning, noise equivalent dose (NED) may be reduced by about 25%. With 3×3 binning, NED may be reduced by about 30%. For larger N, the improvement may be increased.

Figure 9:
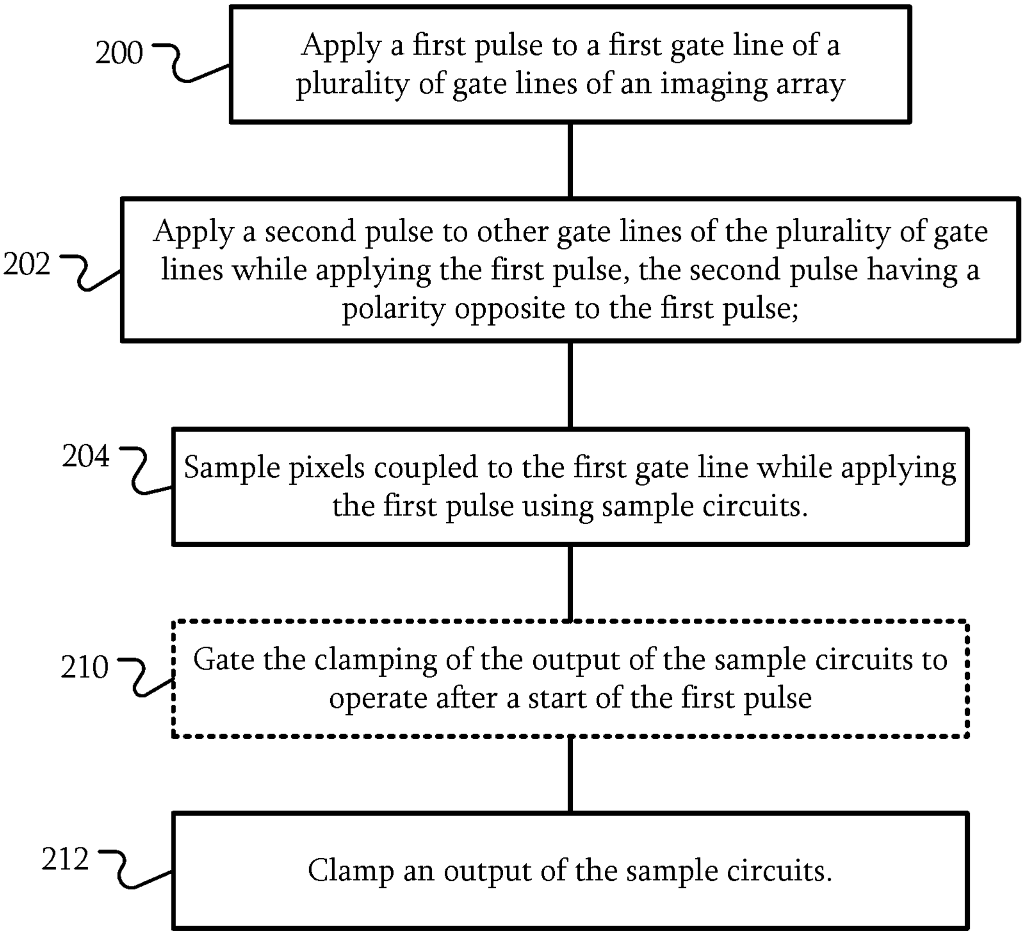
FIG. 9 is a flowchart of an operation of an imaging system with clamping according to some embodiments.

FIG. 9 is a flowchart of an operation of an imaging system with clamping according to some embodiments. A clamping circuit (also known as a clamper or clamp circuits) will bind the upper or lower extreme of a waveform to a fixed level such as a fixed direct current (DC) voltage level of a fixed DC current. Clamping refers to setting a waveform to a specified DC voltage level. Referring to FIGS. 1A, 1B, and 9, in some embodiments, the operation may be similar to that described with respect to FIG. 2. However, in 212, the output of the sampling circuits may be clamped. In a particular example, a charge amplifier may include a defect suppression operation using built-in clamp circuits (e.g., diode clamps).

However, in 3-rail operation, the positive gate pulse may trigger the charge amplifier's clamping circuit and suppress measurement of the desired pixel charge, particularly on the driven end of each row, i.e., the end closer to the row driver 108. To reduce or eliminate this effect, in 210 the clamping of the output of the sampling circuits may be gated to operate after a start of the first pulse. For example, the clamping circuit may be gated to operate about 1 microsecond (μs) after the first pulse S1 has been applied. In so doing, the charge amplifier may be able to measure the pixel charge across the entire panel without overloading.

Figure 10A:
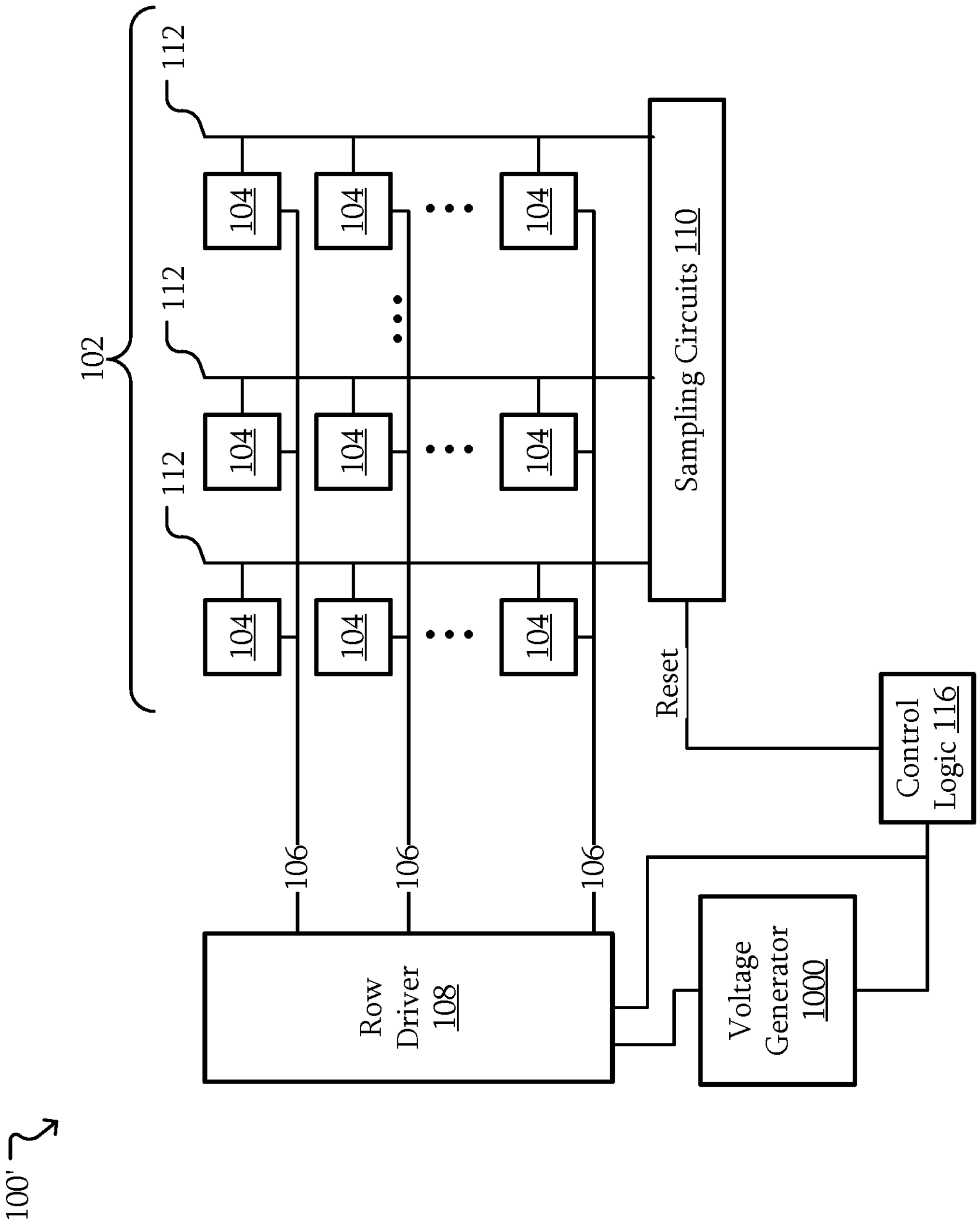
FIG. 10A is a block diagram of an imaging system according to some embodiments.
Figure 10B:
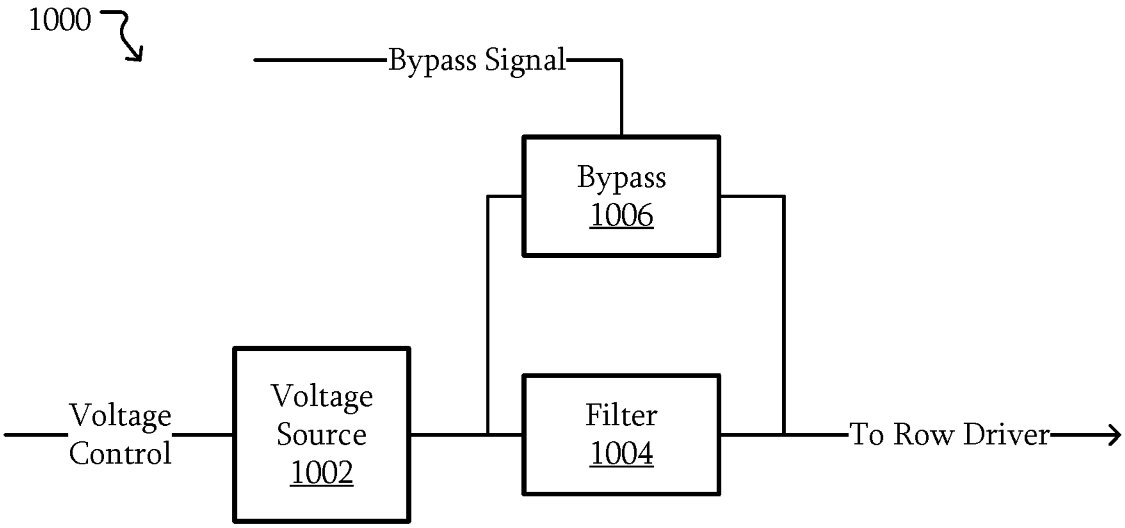
FIG. 10B is a block diagram of a voltage generator of the imaging system of FIG. 1A.

FIG. 10A is a block diagram of an imaging system according to some embodiments. FIG. 10B is a block diagram of a voltage generator of the imaging system of FIG. 1A. Referring to FIGS. 10A and 10B, in some embodiments, the system 100' may be similar to the system 100 of FIG. 1A. However, the system 100' includes a voltage generator 1000. The voltage generator 1000 is configured to generate a voltage for the compensation pulse.

The voltage generator 1000 may include a voltage source 1002, a filter, 1004, and a bypass circuit 1006. The voltage source 1002 may include various circuits to generate different voltages in response to a voltage control signal from the control logic 116. For example, the voltage source 1002 may include a direct current to direct current (DC-to-DC) converter, boost circuits, or the like. In some embodiments, the voltage source 1002 may include a high precision digital-to-analog converter (DAC). In some embodiments, the DAC is configured to generate the compensation voltage. In other embodiments, the DAC may be configured to generate an adjustable offset voltage that is added to a base voltage to generate the compensation voltage. The adjustable offset voltage may be adjustable over a range of about 0 volts (V) to about −0.5 V. However, in other embodiments, the range of the offset voltage may be different. The base voltage may include, for example, an off voltage for the switches 114. The adjustable offset voltage may be added to the base voltage using high precision resistors having a tolerance of +/−0.1% or less. Using high precision resistors and a high precision DAC, a variability between imaging systems 100' may be reduced.

The generated compensation voltage may be filtered by the filter 1004. In some embodiments, the filter 1004 includes a low pass filter. The compensation voltage may need to be relatively stable. A less stable compensation voltage may introduce drift in the dark levels. In some embodiments a cutoff frequency of the filter 1004 may be less than about 1 Hz.

In some embodiments, to maximize dynamic range, the mean dark level of the array 102 should be controlled to be as low as possible without causing underflow to the entire image. A fine adjustment of the compensation voltage may aid in controlling the mean dark level.

In some embodiments, the compensation voltage may be changed for different operating modes.

Figure 10C:
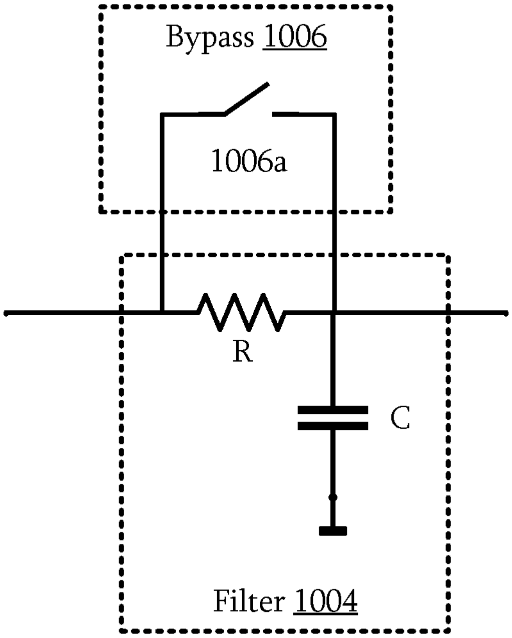
FIG. 10C is a block diagram of an example of a filter and bypass circuit of FIG. 10B according to some embodiments

FIG. 10C is a block diagram of an example of a filter and bypass circuit of FIG. 10B according to some embodiments. The bypass circuit 1006 may include a switch 1006*a*. The filter 1004 may include a resistor R and a capacitor C coupled together in a low pass configuration. The switch 1006*a* may be coupled in parallel with the filter 1004 and, in particular, in parallel with the resistor R. Accordingly, when the switch 1006*a* is open, the circuit operates as a low pass filter. When the switch 1006*a* is closed, the circuit is more responsive, acting as a capacitive load.

Figure 11:
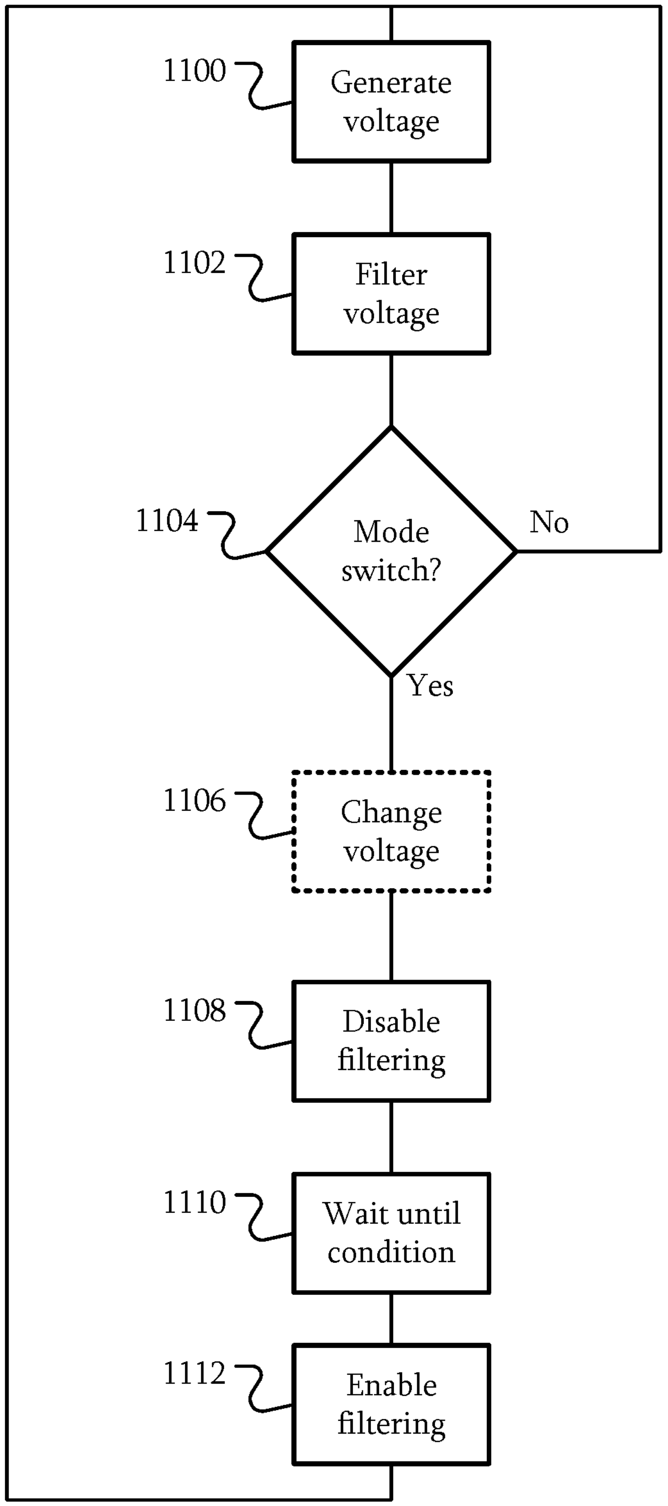
FIG. 11 is a flowchart of the generation of the compensation voltage according to some embodiments.

FIG. 11 is a flowchart of the generation of the compensation voltage according to some embodiments. Referring to FIGS. 10A, 10B, and 11, in some embodiments, after a mode switch, a new compensation voltage that is different may be used. A mode switch may include a variety of changes in the operation of the imaging system 100'. For example, a mode switch may include a changing in a setting, a change in gain, a change in resolution, a change in binning, a change in feedback capacitance on an amplifier, or the like. In a particular example, a doctor may be using low dose x-rays while panning the imaging system 100'. When a region of interest is found, the operation of the imaging system 100' may be switched to accommodate a higher dose such as by changing a gain.

In some embodiments, the compensation pulse is applied to multiple gate lines 106. The combined capacitance of these gate lines puts a significant load on the voltage generator 1000 when changing the voltage during a mode switch, changing the level of binning, or the like. This load may lead to relatively long stabilization times. In particular, the compensation pulse may need an amount of stability to reduce or eliminate drift of dark levels. This stability may be on the order of microvolts (μV). The filter 1004 may have a significant time constant T. Multiples of T, such as 10 to 15 T, may be needed to achieve the desired amount of stability. This may result in a time to stabilize on the order of 20-30 seconds.

If the filter 1004 alone is used, the amount of time to stabilize may be too long. However, using a bypass circuit 1006 as described herein may allow the stabilization time to be reduced. For example, the stabilization time may be reduced to be less than 100-400 milliseconds (ms). The bypass circuit 1006 may be configured to bypass the filter 1004 to approach the new desired voltage or accommodate the changed load without the lag of the filter 1004. The bypass circuit 1006 may be disabled and the filter 1004 may resume the normal operation.

In a particular example, during normal operation in 1100, the compensation voltage may be generated in 1100. The compensation voltage may be filtered in 1102 by the filter 1004. This operation may continue until a mode switch occurs in 1104.

If a mode switch has occurred in 1104, the compensation voltage may be changed in 1106. For example, the control logic 116 may be configured to control the voltage source 1002 to generate a different voltage by changing a setpoint of a DAC. In other embodiments, a change in load conditions due to the mode switch may cause a transient change in the compensation voltage. That is, the compensation voltage may not change, but the load changes, causing a transient change in the compensation voltage.

The filter 1004 may take relatively long amount of time to settle on the desired compensation voltage. To decrease the settling time, the filtering may be disabled in 1108. For example, the bypass circuit 1106 may include one or more switches or transistors. When turned on, the transistors may bypass resistive elements of the filter 1104. For example, the transistors may be coupled to resistors in parallel such that the capacitors, inductors, or other elements may reach a steady state faster. As described above with respect to FIG. 10C, a resistor of the filter 1004 may be bypassed. In some embodiments, all resistors of the filter may be bypassed; however, in other embodiments, less than all of the resistors may be bypassed.

In 1110, the process may wait until a condition has occurred. In some embodiments, the condition may include the passage of an amount of time such as 50-200 ms. In other embodiments, the condition may be the current supplied by voltage source 1002 falling below a threshold. In other embodiments, the condition may be when the voltage is within a percentage of the compensation voltage, within an absolute amount from the compensation voltage such as 1-10 mV, or the like.

In 1112, after the condition has occurred, the filtering is enabled. For example, the bypass circuit 1006 may be disabled. In some embodiments, the transistors in parallel with the resistors may be turned off. The generation of the new voltage in 1100 and the filtering of the voltage in 1102 may continue. The time to stabilize the filtered voltage may be reduced relative to the time from using the filter 1004 alone.

In some embodiments, the condition in 1110 may be based on configuration data of the system 100'. A dark level image, i.e., an image generated with no incident x-rays, may be indicative of a stability of the compensation voltage. A calibration procedure may be performed where dark images are obtained periodically after a mode switch. Once the dark level has stabilized, a time used as the condition in 1110 may be determined based on the elapsed time to stabilize the dark level.

This operation may allow for compensation of array-to-array variations, such as variations due to manufacture, temperature, TFT aging, or the like. The calibration procedure may be periodically performed by measuring the dark level as part of a normal dark offset calibration. Before averaging dark frames, the average dark level may be measured. The gate compensation DAC setting may be dynamically adjusted to force the mean value of the dark level to match a target value programmed for the particular mode of operation. In some embodiments, this operation may only use a few frames, such as 1-4 frames. Afterwards, the normal dark level calibration may proceed. During this operation, the bypass circuit 1006 may be enabled to increase the speed of the operation of changing the compensation voltage.

Figure 12:
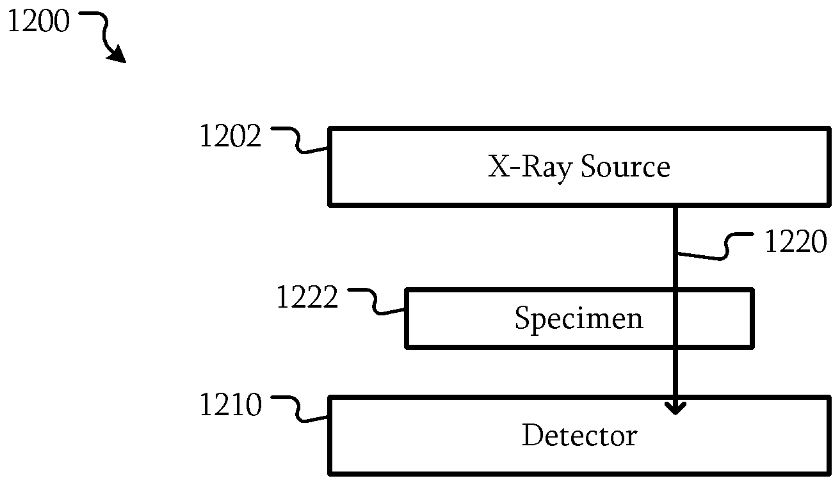
FIG. 12 is a block diagram of a 2D x-ray imaging system according to some embodiments.

FIG. 12 is a block diagram of a 2D x-ray imaging system according to some embodiments. The 2D x-ray imaging system 1200 includes an x-ray source 1202 and detector 1210. The detector 1210 may include an imaging system 100, 100', or the like as described above. The x-ray source 1202 is disposed relative to the detector 1210 such that x-rays 1220 may be generated to pass through a specimen 1222 and detected by the detector 1210. In some embodiments, the detector 1210 is part of a medical imaging system. In other embodiments, the 2D x-ray imaging system 1200 may include a portable vehicle scanning system as part of a cargo scanning system.

Some embodiments include a method, comprising: applying a first pulse to a first gate line GL, 106 of a plurality of gate lines GL, 106 of an imaging array 102; applying a second pulse to other gate lines GL, 106 of the plurality of gate lines GL, 106 while applying the first pulse, the second pulse having a polarity opposite to the first pulse; sampling pixels 104 coupled to the first gate line GL, 106 while applying the first pulse using sampling circuits 110.

In some embodiments, the method further comprises resetting the sampling circuits 110 before applying the first pulse.

In some embodiments, the method further comprises sampling reset signals associated with the pixels 104 coupled to the first gate line GL, 106 after resetting the sampling circuits 110 and before applying the first pulse.

In some embodiments, the method further comprises applying the first pulse to a set of multiple adjacent gate lines GL, 106 of the plurality of gate lines GL, 106 including the first gate line; wherein the other gate lines GL, 106 do not include the set of multiple adjacent gate lines.

In some embodiments, the method further comprises clamping an output of the sampling circuits 110.

In some embodiments, the method further comprises gating the clamping of the output of the sampling circuits 110 to operate after a start of the first pulse.

In some embodiments, the method further comprises generating a voltage for the second pulse; and filtering the voltage for the second pulse.

In some embodiments, the method further comprises bypassing the filtering of the voltage for the second pulse after a mode change of the imaging array.

In some embodiments, the method further comprises disabling the bypassing of the filtering of the voltage for the second pulse.

In some embodiments, the method further comprises bypassing the filtering of the voltage for the second pulse after a mode change of the imaging array 102 for a predetermined time.

In some embodiments, the method further comprises measuring a dark level of the imaging array 102; and setting a voltage for the second pulse based on the dark level.

Some embodiments include a system, comprising: an imaging array 102 include a plurality of pixels 104 104; a row driver 108 configured to apply voltages to a plurality of gate lines GL, 106 of the imaging array 102; sampling circuits 110 configured to sample signals from the pixels 104 of the imaging array 102; control logic 116 coupled to the row driver 108 and sampling circuits 110, wherein the control logic 116 is configured to: control the row driver 108 to apply a first pulse to a first gate line GL, 106 of the plurality of gate lines; control the row driver 108 to apply a second pulse to other gate lines GL, 106 of the plurality of gate lines GL, 106 while applying the first pulse, the second pulse having a polarity opposite to the first pulse; and control the sampling circuits 110 to sample pixels 104 coupled to the first gate line GL, 106 while applying the first pulse.

In some embodiments, the control logic 116 is further configured to: reset the sampling circuits 110 before applying the first pulse.

In some embodiments, the control logic 116 is further configured to: control the sampling circuits 110 to sample reset signals associated with the pixels 104 coupled to the first gate line GL, 106 after resetting the sampling circuits 110 and before applying the first pulse.

In some embodiments, the control logic 116 is further configured to: control the row driver 108 to apply the first pulse to a set of multiple adjacent gate lines GL, 106 of the plurality of gate lines GL, 106 including the first gate line; wherein the other gate lines GL, 106 do not include the set of multiple adjacent gate lines GL, 106.

In some embodiments, the control logic 116 is further configured to: clamp an output of the sampling circuits 110; and gate the clamping of the output of the sampling circuits 110 to operate after a start of the first pulse.

In some embodiments, the system further comprises a voltage generator configured to generate a voltage for the second pulse; and a filter configured to the voltage for the second pulse, wherein the control logic 116 is further configured to: bypass the filter after a mode change of the imaging array 102; and disable the bypassing of the filter.

In some embodiments, the control logic 116 is further configured to: measure a dark level of the imaging array 102; and set a voltage for the second pulse based on the dark level.

Some embodiments include a system, comprising: means for applying a first pulse to a first gate line of a plurality of gate lines of an imaging array; means for applying a second pulse to other gate lines of the plurality of gate lines while applying the first pulse, the second pulse having a polarity opposite to the first pulse; means for sampling pixels coupled to the first gate line while applying the first pulse.

Examples of the means for applying a first pulse to a first gate line of a plurality of gate lines of an imaging array include the control logic 116, row driver 108, or the like. Examples of the means for applying a second pulse to other gate lines of the plurality of gate lines while applying the first pulse include the control logic 116, row driver 108, or the like. Examples of the means for sampling pixels coupled to the first gate line while applying the first pulse include the sampling circuits 110, control logic 116, data lines 112, or the like.

In some embodiments, the system further comprises means for generating a voltage for the second pulse; means for filtering the voltage for the second pulse; and means for bypassing the filtering of the voltage for the second pulse after a mode change of the imaging array.

Examples of the means for generating a voltage for the second pulse include the voltage generator 1000, voltage source 1002, control logic 116, or the like. Examples of means for filtering the voltage for the second pulse include the filter 1004 or the like. Examples of the means for bypassing the filtering of the voltage for the second pulse after a mode change of the imaging array include the bypass 1006, control logic 116, or the like.

Although particular examples of means for performing particular functions have been described above, in other embodiments, the particular functions may be performed by other means described herein.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claims 1, 3, or 4, with these separate dependencies yielding three distinct embodiments; claim 6 can depend from any one of claims 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. A method, comprising:
applying a first pulse to a first gate line of a plurality of gate lines of an imaging array;
applying a second pulse to other gate lines of the plurality of gate lines while applying the first pulse, the second pulse having a polarity opposite to the first pulse;
sampling pixels coupled to the first gate line using sampling circuits by turning on a sampled signal while applying the first pulse and the second pulse; and
turning off the sampled signal, the first pulse, and the second pulse at the same time.

2. The method of claim 1, further comprising:
resetting the sampling circuits and before applying the first pulse.

3. The method of claim 2, further comprising
sampling reset signals associated with the pixels coupled to the first gate line after resetting the sampling circuits and before applying the first pulse.

4. The method of claim 1, further comprising:
clamping an output of the sampling circuits.

5. The method of claim 4, further comprising:
gating the clamping of the output of the sampling circuits to operate after a start of the first pulse.

6. The method of claim 1, further comprising:
generating a voltage for the second pulse; and
filtering the voltage for the second pulse.

7. The method of claim 6, further comprising:
bypassing the filtering of the voltage for the second pulse after a mode change of the imaging array.

8. The method of claim 7, further comprising:
disabling the bypassing of the filtering of the voltage for the second pulse.

9. The method of claim 6, further comprising:
bypassing the filtering of the voltage for the second pulse after a mode change of the imaging array for a predetermined time.

10. The method of claim 1, further comprising:
applying the first pulse to a set of multiple adjacent gate lines of the plurality of gate lines including the first gate line;
wherein the other gate lines do not include the set of multiple adjacent gate lines.

11. The method of claim 1, further comprising:
measuring a dark level of the imaging array; and
setting a voltage for the second pulse based on the dark level.

12. A system, comprising:
an imaging array include a plurality of pixels;
a row driver configured to apply voltages to a plurality of gate lines of the imaging array;
sampling circuits configured to sample signals from the pixels of the imaging array;
control logic coupled to the row driver and sampling circuits, wherein the control logic is configured to:

control the row driver to apply a first pulse to a first gate line of the plurality of gate lines;

control the row driver to apply a second pulse to other gate lines of the plurality of gate lines while applying the first pulse, the second pulse having a polarity opposite to the first pulse; and control the sampling circuits to sample pixels coupled to the first gate line by turning on a sampled signal while applying the first pulse; and turn off the sampled signal and the first pulse at the same time.

13. The system of claim 12, wherein the control logic is further configured to:

reset the sampling circuits before applying the first pulse.

14. The system of claim 13, wherein the control logic is further configured to:

control the sampling circuits to sample reset signals associated with the pixels coupled to the first gate line after resetting the sampling circuits and before applying the first pulse.

15. The system of claim 12, wherein the control logic is further configured to:

control the row driver to apply the first pulse to a set of multiple adjacent gate lines of the plurality of gate lines including the first gate line;

wherein the other gate lines do not include the set of multiple adjacent gate lines.

16. The system of claim 12, wherein the control logic is further configured to:

clamp an output of the sampling circuits; and gate the clamping of the output of the sampling circuits to operate after a start of the first pulse.

17. The system of claim 12, further comprising:

a voltage generator configured to generate a voltage for the second pulse; and a filter configured to the voltage for the second pulse, wherein the control logic is further configured to:

bypass the filter after a mode change of the imaging array; and disable the bypassing of the filter.

18. The system of claim 17, wherein the control logic is further configured to:

measure a dark level of the imaging array; and set a voltage for the second pulse based on the dark level.

19. A system, comprising:

a row driver for:

applying a first pulse to a first gate line of a plurality of gate lines of an imaging array; and applying a second pulse to other gate lines of the plurality of gate lines while applying the first pulse, the second pulse having a polarity opposite to the first pulse; and a sampling circuit for sampling pixels coupled to the first gate line while applying the first pulse; and a control logic for controlling operations of the row driver and the sampling circuit, wherein the sampling circuit is configured to sample the pixels before turning off the first pulse to the first gate line.

20. The system of claim 19, further comprising:

a voltage source for generating a voltage for the second pulse;

a filter for filtering the voltage for the second pulse; and a bypass circuit for bypassing the filtering of the voltage for the second pulse after a mode change of the imaging array.

* * * * *